United States Patent [19]

Lazarchik et al.

[11] Patent Number: 5,201,253

[45] Date of Patent: Apr. 13, 1993

[54] SHAVING SYSTEM

[75] Inventors: Daniel B. Lazarchik, Boston; Henryk J. Chylinski, Haverhill, both of Mass.

[73] Assignee: The Gillette Company, Boston, Mass.

[21] Appl. No.: 903,916

[22] Filed: Jun. 25, 1992

Related U.S. Application Data

[60] Continuation of Ser. No. 756,343, Sep. 6, 1991, which is a division of Ser. No. 559,646, Jul. 30, 1990, Pat. No. 5,088,195.

[51] Int. Cl.$^5$ .............................................. B21K 21/00
[52] U.S. Cl. ................................ 76/116; 76/DIG. 8; 72/379.2; 30/49
[58] Field of Search ............... 76/116, 101.1, DIG. 8; 30/43, 49, 346.55, 346.61; 72/379.2

[56] References Cited

U.S. PATENT DOCUMENTS

| | | | |
|---|---|---|---|
| 1,877,758 | 9/1932 | Kylberg | 76/DIG. 8 |
| 2,182,067 | 12/1939 | Bruecker | 76/116 |
| 2,598,711 | 6/1952 | Musso | 30/346.61 |
| 2,614,321 | 10/1952 | Ackerman | 30/49 |
| 3,216,286 | 11/1965 | Heyek | 76/116 |
| 3,702,026 | 11/1972 | Scholin | 30/49 |
| 4,807,360 | 2/1989 | Cerier | 30/49 |
| 4,875,288 | 10/1990 | Trotta | 30/49 |
| 4,964,214 | 7/1988 | Welsh | 30/49 |
| 4,979,298 | 12/1990 | Pesiri | 30/49 |
| 4,984,365 | 1/1991 | Leonard | 30/49 |

FOREIGN PATENT DOCUMENTS 598803  10/1959  Italy ........................ 30/346.55

Primary Examiner—Douglas D. Watts
Assistant Examiner—Hwei-Siu Payer
Attorney, Agent, or Firm—Fish & Richardson

[57] ABSTRACT

A shaving system that includes a holder and a blade meber secured to the holder. The blade member has an aperture that defines an annular sharpened edge with main facet portions that converge at an angle of less than 30° and supplemental facet portions that are extensions of the main facet portions and define an ultimate tip defining portion that has an included angle of less than 30°. The supplemental facet portions are offset in the same direction from the main facet portions each at an angle of less than 175°, the outer main facet portion defines a shaving plane, the ultimate tip is disposed above the shaving plane less than 0.1 millimeter, and the bisector of the included angle defined by the supplementary facets is disposed at an angle to the shaving plane in the range of 15°–35°.

10 Claims, 2 Drawing Sheets

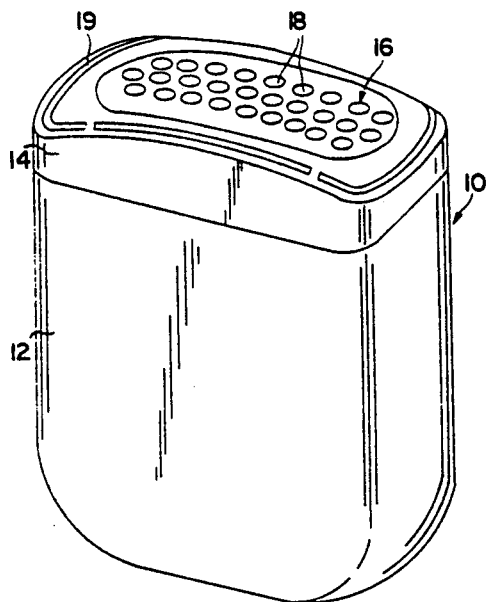
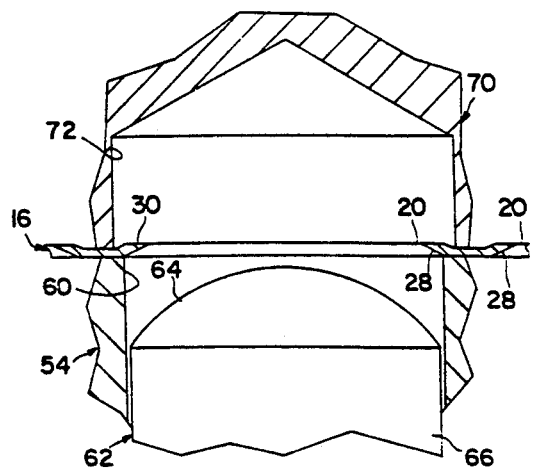
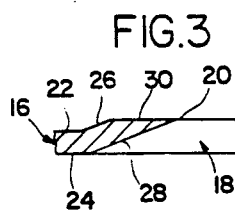
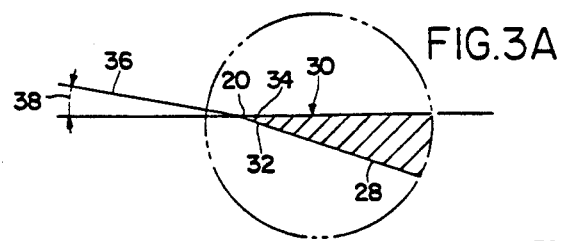
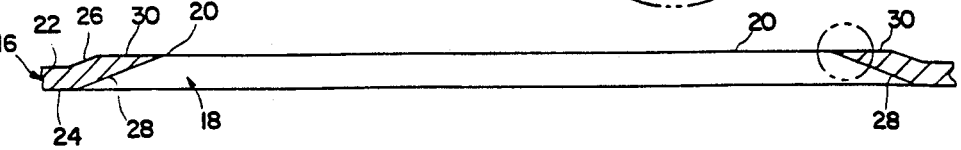
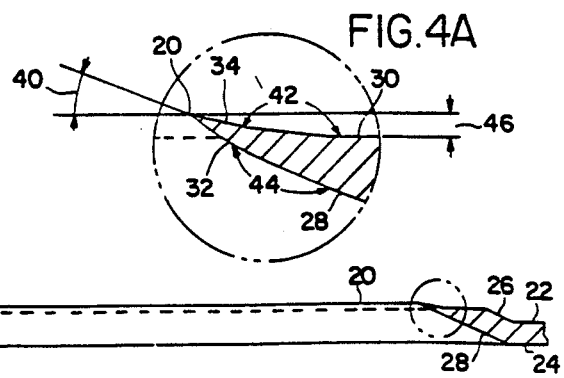

SHAVING SYSTEM

This is a continuation of copending application Ser. No. 07/756,343, filed Sep. 6, 1991, which is a division of copending application Ser. No. 07/559,646, filed Jul. 30, 1990, U.S. Pat. No. 5,088,195.

This invention relates to shaving systems, and more particularly to shaving systems that employ a blade structure with annular cutting edge structure, and to methods and apparatus of manufacturing such blade structures.

A number of shaving systems with blade structures that have annular cutting edge structure have been proposed, see for example Ackerman, U.S. Pat. No. 2,614,321, Musso, U.S. Pat. No. 3,465,436, Scholin, U.S. Pat. No. 3,702,026, Cerier, U.S. Pat. No. 4,807,360, Trotta, U.S. Pat. No. 4,875,288 and PCT Published Application PCT/GB88/00014. In general, shaving characteristics of such shaving systems have not been entirely satisfactory.

In accordance with one aspect of the invention, there is provided a shaving system that includes a holder and a blade member secured to the holder. The blade member has an aperture that defines an annular sharpened edge that is defined by main facet portions that converge at an angle of less than 30° and supplemental facet portions that are extensions of the main facet portions and define an ultimate tip defining portion that has an included angle of less than 30°. The supplemental facet portions are offset in the same direction from the main facet portions each at an angle of less than 175°, the outer main facet portion defines a shaving plane, the ultimate tip is disposed above the shaving plane less than 0.1 millimeter, and the bisector of the included angle defined by the supplementary facets is disposed at an angle to the shaving plane in the range of 15°–35°.

The blade structure may take a variety of forms, and the apertures may be of circular, elongated or other shape. In preferred embodiments, the aperture has a width dimension (the distance between opposed sharpened edges of the same aperture) of less than six millimeters; the radial length dimension of the main facet portion that defines the shaving plane is at least about twice the radial length of the contiguous supplemental facet portion; the supplemental facet portions are offset in the same direction from the main facet portions each at an angle in the range of 135°–175°; and the ultimate tip is disposed less than 0.05 millimeter above the shaving plane.

In a particular embodiment, the blade member is a foil member that has a thickness of less than 0.3 millimeter, a plurality of apertures are in the foil member, and each aperture has an annular sharpened edge with supplemental facet portions that are each about 0.1 millimeter in radial length and that define an ultimate tip that is disposed about 0.03 millimeter above the shaving plane.

In accordance with another aspect of the invention, there is provided a method of manufacturing a razor blade that includes the steps of providing a blade member with an annular aperture therein, sharpening the edge of the aperture to provide an annular shaving edge, and cold-working the portion of the annular edge portion immediately adjacent to the ultimate sharpened tip to bend that edge portion and mechanically displace the ultimate tip to provide a shaving angle relative to the plane of the blade member in the range of 15°–35° and an exposure in the range of about 0.01–0.1 millimeter. The cold-working and mechanical displacement of the sharpened edge may be performed by various mechanisms such as linear punches, spinning mechanisms, and ultrasonic vibration.

In a particular embodiment, the method includes the steps of providing a metal strip with an array of apertures therein, sharpening the edges of the apertures to provide an array of annular shaving edges, and using punch and die structure to impart a permanent bend in the portion of each annular edge portion immediately adjacent to the ultimate sharpened tip of each annular sharpened edge to provide supplemental facets that define a shaving angle of about 5°, and an exposure of about 0.03 millimeter.

In accordance with another aspect of the invention, there is provided apparatus for manufacturing razor blade structure that has an aperture with an annular sharpened edge, the apparatus including punch structure, a punch member upstanding from the punch structure of configuration identical to the configuration of the annular sharpened edge and of slightly greater dimension, die structure having a die recess of configuration identical to the configuration of the annular sharpened edge and of slightly greater dimension than the punch member, structure for positioning the razor blade structure between the punch and die structures, and structure for moving the punch and die structures towards one another to cold-work the portion of the annular edge portion immediately adjacent to the ultimate sharpened tip and mechanically displace the ultimate tip and provide a shaving angle in the range of 15°–35° and an exposure in the range of about 0.01–0.1 millimeter.

In a particular embodiment, the razor blade structure is a metal foil strip with an array of apertures, pressure plate structure cooperates with the punch structure and includes an array of apertures corresponding to the apertures in the metal foil strip, the punch structure carries an array of floating punch members that are disposed in the apertures of the pressure plate structure, and the apparatus imparts a permanent bend in the portion of each annular edge portion immediately adjacent to the ultimate sharpened tip of each annular sharpened edge to provide supplemental facets that define a shaving angle relative to the plane of the metal strip of about 25°, and an exposure of about 0.03 millimeter.

Other features and advantages of the invention will be seen as the following description of particular embodiments progresses, in conjunction with the drawings, in which:

FIG. 1 is a perspective view of a shaving system in accordance with the invention;

FIG. 3 is an enlarged sectional view of an aperture of the foil member of FIG. 2 after preliminary processing;

FIG. 3A is an enlarged view of a portion of the view shown in FIG. 3;

FIG. 4 is an enlarged sectional view (similar to FIG. 3) of an aperture of the foil member of FIG. 2 after supplementary processing;

FIG. 4A is an enlarged view (similar to FIG. 3A) of a portion of the view shown in FIG. 4, showing the configuration of the ultimate edge of a sharpened aperture of the foil member shown in FIG. 2;

FIG. 7 is an enlarged sectional view of a portion of one stage of the punch and die mechanism shown in FIG. 5.

DESCRIPTION OF PARTICULAR EMBODIMENTS

Figure 2:
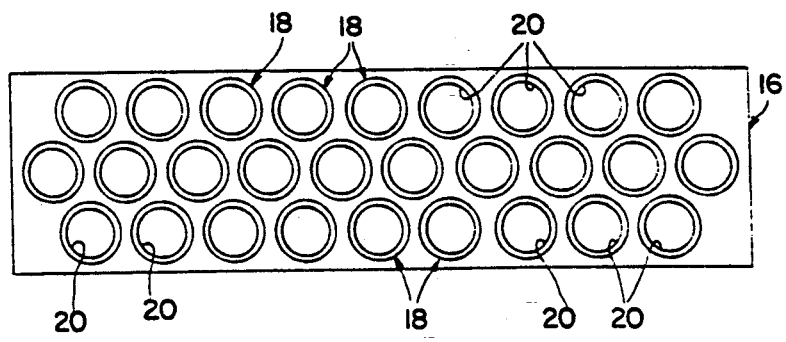
FIG. 2 is a plan view of a foil member employed in the shaving system shown in FIG. 1.

The shaving system 10 shown in FIG. 1 includes handle portion 12 that is secured to cap portion 14. Carried by cap portion 14 is metal foil strip 16 that has an array of apertures 18 and skin conditioning number 19 that extends thereabout. Shaving system 10 has a height of about 6.5 centimeters, a width of about 5.7 centimeters and a depth of about 2.4 centimeters.

The metal foil strip 16, shown in FIG. 2, is manufactured of 0.1 millimeter thick strip steel and has a length of about 4.3 centimeters and a width of about 1.2 centimeters. Formed in foil strip 16 are an array of twenty-eight circular apertures 18 disposed in three rows that are spaced about four millimeters on center. Each aperture 18 has a diameter of about three millimeters and the circular edge 20 is sharpened to a shaving edge, as indicated in FIG. 3. In other foil strip embodiments, circular apertures are disposed in different arrays and have diameters in the range of 2.0–3.5 millimeters, and the circular edges of the several apertures are similarly processed in manner described below.

As shown in FIGS. 3 and 4, the body of strip 16 has upper surface 22 and lower surface 24. Surrounding each aperture 18 are annular portions 26, 28 that are inclined at an angle of about 20° to surfaces 22 and 24 respectively, and are formed by mechanical displacement and coining processes. Upper inclined portions 26 are then abraded in grinding and honing operations to form facets 30 that are parallel to and offset about 0.03 millimeter from surface 22, and have radial lengths of about 0.3 millimeter each. Facets 30 are parallel to the plane of strip 16 and define a shaving plane.

Further enlarged views are shown in FIGS. 3A and 4A. As shown in those figures, the ultimate tip 20 of each blade aperture 18 is defined by surfaces 32, 34 that are disposed at an angle of about 20° to each other and are extensions of surfaces 28, 30 respectively. After preliminary processing, as indicated in FIGS. 3 and 3A, the half angle between surfaces 32, 34, as indicated by line 36 is such that line 36 is inclined at an angle 38 of about 10° to the shaving plane defined by surface 30. The foil strip 16 is then further processed by cold-working and bending the steel immediately adjacent ultimate tip to shift the ultimate edge upwardly such that the inclination of the half angle line 36 between surfaces 32, 34 is increased to an angle 40 of about 25° to the shaving plane of strip 16. In this condition, the angle 42 between surfaces 30 and 34 is about 165° and the angle 44 between surfaces 28 and 32 is about 195°. Facet surfaces 32, 34 each have a length of about 0.1 millimeter and ultimate tip 20 is offset (exposure 46) about 0.03 millimeter above facet surface 30.

Figure 6:
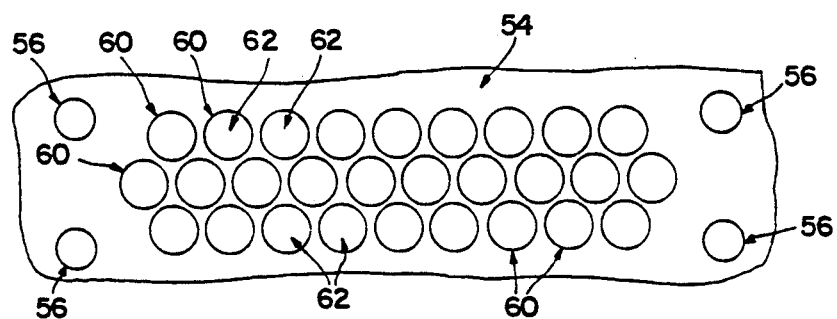
FIG. 6 is a plan view of the edge upturning pressure plate assembly employed in the forming of the razor blade as shown in FIGS. 2 and 4.
Figure 5:
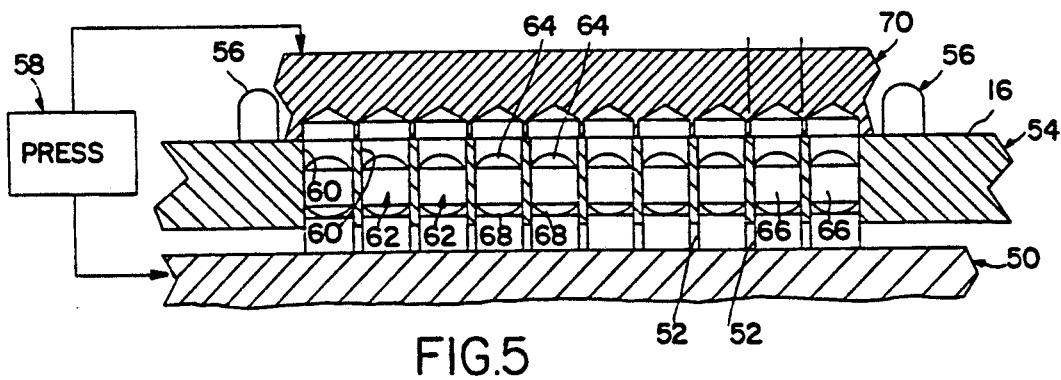
FIG. 5 is a sectional view of a punch and die mechanism employed in the forming of the razor blade as shown in FIGS. 2 and 4.

The edge geometry illustrated in FIGS. 4 and 4A is formed with the punch and die mechanism shown in FIGS. 5–7. That mechanism includes punch plate 50 that is mounted in fixed location and has an array of upstanding posts 52 corresponding to the configuration of apertures 18 in foil strip 16. Disposed above punch plate 50 is spring-biased pressure plate 54 that has upstanding pilot posts 56 that receive pilot holes (not shown) in foil strip 16 so that strip 16 is accurately located relative to guide channels 60 (of about 3.7 millimeter diameter) in pressure plate 54. Received in channels 60 are hardened steel floating punch members 62 (of about 3.4 millimeter diameter), each of which has a spherical upper surface 64 of about 2.4 millimeter radius, cylindrical body portion 66 of about 3.4 millimeter diameter, and spherical lower surface 68 whose center of radius is coincident with the center of radius of upper surface 64. Die plate 70 has an array of die recesses 72 of about four millimeters diameter each corresponding to an aperture 18 in foil strip 16

In operation, strip 16 is positioned on pressure plate 54 as aligned by guide posts 56, and die plate 70 is moved downward by conventional mechanism 58, capturing strip 16 as indicated in FIGS. 5 and 7. As pressure plate 54 is moved downwardly by die plate 70, the surfaces 64 of floating punch members 62 engage the ultimate sharpened edges 20 of apertures 18 at a contact angle of about 40° and bend supplemental facets 32, 34 upwardly in metal-working action, shifting the ultimate edges 20 uniformly upwardly about 0.03 millimeter to provide the stable blade edge configuration illustrated in FIGS. 4 and 4A (an exposure of about 0.03 millimeter and a shaving angle of about 25°).

Coatings of metal and/or polymer may be applied to the sharpened edges, as desired and the processed strip is assembled in shaving system 10. The resulting shaving system exhibits quality shaving characteristics and good shaving life.

While particular embodiments of the invention have been shown and described, various modifications thereof will be apparent to those skilled in the art, and therefore it is not intended that the invention be limited to the disclosed embodiments, or to details thereof, and departures may be made therefrom within the spirit and scope of the claims.

What is claimed is:

1. A method of manufacturing a razor blade comprising the steps of providing a blade member with an aperture therein, sharpening the edge of said aperture to provide an annular shaving edge with a first portion that defines a main facet and a second portion that has an ultimate sharpened tip, and mechanically displacing said second portion of said annular shaving edge immediately adjacent to said ultimate sharpened tip to provide a shaving angle in the range of 15°–35°, and an exposure in the range of about 0.01–0.1 millimeter.

2. The method of claim 1 wherein said providing step includes the step of providing a blade member with an aperture that has a width dimension of less than six millimeters, said sharpening step provides said first portion with main facet portions on upper and lower surfaces of said blade member, and said mechanical displacing step offsets said second portion from said first portion to provide supplemental facet portions of said annular shaving edge that are offset in the same direction from said main facet portions of said annular shaving edge each at an angle in the range of 135°–175°.

3. The method of claim 2 wherein said mechanically displacing step provides said supplemental facet portions of said annular shaving edge that have a radial length of less than about 0.3 millimeter, and said main facet portions of said annular shaving edge have a radial length of at least twice the radial length of said supplemental facet portions.

4. The method of claim 1 wherein said providing a blade member step includes providing a blade member in the form of a metal strip with an array of apertures therein, said sharpening step sharpens the edges of said apertures to provide an array of annular shaving edges, and said mechanically displacing step includes the use of punch and die structure to impart a permanent bend in a portion of each said annular shaving edge immediately adjacent to the ultimate sharpened tip of each said annular shaving edge to provide supplemental facets that define a shaving angle relative to the plane of said metal strip of about 25° and an exposure of about 0.03 millimeter.

5. The method of claim 4 wherein said metal strip provided by said providing step has at least ten shaving edge defining apertures of circular configuration, said metal strip has a thickness of less than 0.3 millimeter, and each said aperture has a width dimension of less than about six millimeters.

6. A method of manufacturing a razor blade comprising the steps of providing a planar blade member with an aperture therein, mechanically displacing the perimeter portion of said blade member surrounding said aperture to provide a raised perimeter portion, sharpening the edge of said raised perimeter portion of said aperture to provide an annular shaving edge with a first portion that defines a main facet and a second portion that has an ultimate sharpened tip, and mechanically displacing said second portion of said annular shaving edge immediately adjacent to said ultimate sharpened tip to provide a shaving angle in the range of 15°–35°, and an exposure in the range of about 0.01–0.1 millimeter.

7. The method of claim 6 wherein said providing step includes the step of providing said planar blade member with an aperture that has a width dimension of less than six millimeters, said sharpening step provides said first portion with main facet portions on upper and lower surfaces of said blade member, and said mechanical displacing said second portion step offsets said second portion from said first portion to provide supplemental facet portions of said annular shaving edge that are offset in the same direction from said main facet portions of said annular shaving edge each at an angle in the range of 135°–175°.

8. The method of claim 7 wherein said mechanically displacing said second portion step provides said supplemental facet portions of said annular shaving edge that have a radial length of less than about 0.3 millimeter, and said main facet portions of said annular shaving edge have a radial length of at least twice the radial length of said supplemental facet portions.

9. The method of claim 6 wherein said providing step includes providing said planar blade member in the form of a metal strip with an array of apertures therein, said sharpening step sharpens the edges of said apertures to provide an array of annular shaving edges, and said mechanically displacing said second portion step includes the use of punch and die structure to impart a permanent bend in a portion of each said annular shaving edge immediately adjacent to the ultimate sharpened tip of each said annular shaving edge to provide supplemental facets that define a shaving angle relative to the plane of said metal strip of about 25° and an exposure of about 0.03 millimeter.

10. The method of claim 9 wherein said planar metal strip provided by said providing step has at least ten shaving edge defining apertures of circular configuration, said metal strip has a thickness of less than 0.3 millimeter, and each said aperture has a width dimension of less than about six millimeters.

* * * * *